(12) United States Patent
Liu et al.

(10) Patent No.: US 6,807,290 B2
(45) Date of Patent: Oct. 19, 2004

(54) RAPID COMPUTER MODELING OF FACES FOR ANIMATION

(75) Inventors: Zicheng Liu, Bellevue, WA (US); Zhengyou Zhang, Redmond, WA (US); Michael F. Cohen, Seattle, WA (US); Charles E. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 09/754,938

(22) Filed: Jan. 4, 2001

(65) Prior Publication Data

US 2002/0012454 A1 Jan. 31, 2002

Related U.S. Application Data

(60) Provisional application No. 60/188,603, filed on Mar. 9, 2000.

(51) Int. Cl.[7] .................................................. G06K 9/00
(52) U.S. Cl. ........................................ 382/118; 382/154
(58) Field of Search ................................ 382/118, 115, 382/100, 154, 190, 276, 295–297, 116, 203, 117, 162, 164–165, 107, 103, 285, 236, 233, 232; 345/419, 420, 423, 441, 473, 418, 474; 348/14.1, 77–78

(56) References Cited

U.S. PATENT DOCUMENTS

| | | | | |
|---|---|---|---|---|
| 5,469,512 A | * | 11/1995 | Fujita et al. | 382/118 |
| 5,774,591 A | * | 6/1998 | Black et al. | 382/236 |
| 5,990,901 A | | 11/1999 | Lawton et al. | |
| 6,072,496 A | * | 6/2000 | Guenter et al. | 345/419 |
| 6,301,370 B1 | | 10/2001 | Steffens et al. | |
| 6,496,594 B1 | | 12/2002 | Prokoski | |
| 6,664,956 B1 | * | 12/2003 | Erdem | 345/419 |

OTHER PUBLICATIONS

Soon–Cang Pei et al., Global Motion Estimation in Model–Based Image Coding by Tracking Three–Dimensional Contour Featu Points, IEEE 1051–8215/98, 181–190.*
Pighin et al., Resynthesizing facial animation through 3D model–tracking, IEEE Inspec Accession No. 6371194, 1–8.*
Shakunaga et al., Integration of eigentemplate and structure matching for automatic facial feature detection, IEEE Inspec Accession No. 5920393, 1–6.*
Perlin, Reatme responsive animation with personality, IEEE 1071–2626/95, 5–15.*
Skaria et al., Modeling subdivision control meshes for creating coorton faces, IEEE 0–7695–0853–7/01, 216–225.*
Parke, Computer graphics models for the human face, IEEE CH515–6/79/0000–0724, 724–727.*
Terzopoulos et al., Analysis of facial images using physical and anatomical models, IEEE CH2934–8/90/0000/072, 727–732.*

(List continued on next page.)

*Primary Examiner*—Leo Boudreau
*Assistant Examiner*—Ishrat Sherali
(74) *Attorney, Agent, or Firm*—Lee & Hayes, PLLC

(57) ABSTRACT

Described herein is a technique for creating a 3D face model using images obtained from an inexpensive camera associated with a general-purpose computer. Two still images of the user are captured, and two video sequences. The user is asked to identify five facial features, which are used to calculate a mask and to perform fitting operations. Based on a comparison of the still images, deformation vectors are applied to a neutral face model to create the 3D model. The video sequences are used to create a texture map. The process of creating the texture map references the previously obtained 3D model to determine poses of the sequential video images.

10 Claims, 4 Drawing Sheets

OTHER PUBLICATIONS

DiPaola, FaceSpace: a facial spatial domain toolkit, IEEE 1093–9547, 1–5.*

DeCarlo et al. An anthropometric face model using variational techniques, University of Pennsylvania, 1–8.*

Blanz et al., Face recohgnition based on fitting a 3d morphable mode, IEEE 0162–8828/03, 1063–1074.*

Zheng et al., 3D models from contours, IEEE 0–8186, 349–353.*

Vetter et al., Linear object classes and image synthesis, IEEE 0162–8828/97, 733–741.*

Dariush et al., Spatiotemporal analysis of face profiles, IEEE Inspec Accession No. 5920418, 248–253.*

Akimoto et al., Automatic creation of 3D facial models, IEEE 0272–16/93, 16–22.*

Faugeras "*Three Dimensional Computer Vision*"; 1999; pp. 1–663.

Zhang; "*A New Multistage Approach to Motion and Structure Estimation: From Essential Parameters to Euclidean Motion Via Fundamental Matrix*"; Jun. 1996; pp. 1–38.

More; "*The Levenberg–Marquardt Algorithm: Implentation and Theory*"; 1978; pp. 105–116.

Jebara et al; "*Parametrized Structure from Motion for 3D Adaptive Feedback Tracking of Faces*"; 1997, pp. 144–150.

Fua; "*Using Model–Driven Bundle–Adjustment to Model Heads from Raw Video Sequence*"; pp. 1–8.

Zhang; "*On sthe Optimization Criteria Used in Two–View Motion Analysis*"; Jul. 1998; pp. 717–729.

Pighin et al; "*Synthesizing Realistic Facial Expressions from Photographs*"; pp. 1–20.

Fua et al; "*From Regular Images to Animated Heads: A Least Squares Approach*"; pp. 1–15.

Kang et al; "*Appearance–based Structure from Motion Using Linear Classes of 3–D Models*"; pp. i–ii, 1–32.

* cited by examiner

RAPID COMPUTER MODELING OF FACES FOR ANIMATION

RELATED APPLICATIONS

This application claims priority to an earlier filed U.S. Provisional Patent Application entitled "Rapid Modeling of Animated Faces From Video", Ser. No. 60/188,603, filed Mar. 9, 2000 to inventors Zicheng Liu, Zhengyou Zhang, Charles E. Jacobs, and Michael F. Cohen.

TECHNICAL FIELD

The disclosure below relates to generating realistic three-dimensional human face models and facial animations from still images of faces.

BACKGROUND

One of the most interesting and difficult problems in computer graphics is the effortless generation of realistic looking, animated human face models. Animated face models are essential to computer games, film making, online chat, virtual presence, video conferencing, etc. So far, the most popular commercially available tools have utilized laser scanners. Not only are these scanners expensive, the data are usually quite noisy, requiring hand touchup and manual registration prior to animating the model. Because inexpensive computers and cameras are widely available, there is a great interest in producing face models directly from images. In spite of progress toward this goal, the available techniques are either manually intensive or computationally expensive.

Facial modeling and animation has been a computer graphics research topic for over 25 years [6, 16, 17, 18, 19, 20, 21, 22, 23, 27, 30, 31, 33]. The reader is referred to Parke and Waters' book [23] for a complete overview.

Lee et al. [17, 18] developed techniques to clean up and register data generated from laser scanners. The obtained model is then animated using a physically based approach.

DeCarlo et al. [5] proposed a method to generate face models based on face measurements randomly generated according to anthropometric statistics. They showed that they were able to generate a variety of face geometries using these face measurements as constraints.

A number of researchers have proposed to create face models from two views [1, 13, 4]. They all require two cameras which must be carefully set up so that their directions are orthogonal. Zheng [37] developed a system to construct geometrical object models from image contours, but it requires a turn-table setup.

Pighin et al. [26] developed a system to allow a user to manually specify correspondences across multiple images, and use vision techniques to computer 3D reconstructions. A 3D mesh model is then fit to the reconstructed 3D points. They were able to generate highly realistic face models, but with a manually intensive procedure.

Blanz and Vetter [3] demonstrated that linear classes of face geometries and images are very powerful in generating convincing 3D human face models from images. Blanz and Vetter used a large image database to cover every skin type.

Kang et al. [14] also use linear spaces of geometrical models to construct 3D face models from multiple images. But their approach requires manually aligning the generic mesh to one of the images, which is in general a tedious task for an average user.

Fua et al. [8] deform a generic face model to fit dense stereo data, but their face model contains a lot more parameters to estimate because basically all of the vertexes are independent parameters, plus reliable dense stereo data are in general difficult to obtain with a single camera. Their method usually takes 30 minutes to an hour, while ours takes 2–3 minutes.

Guenter et al. [9] developed a facial animation capturing system to capture both the 3D geometry and texture image of each frame and reproduce high quality facial animations. The problem they solved is different from what is addressed here in that they assumed the person's 3D model was available and the goal was to track the subsequent facial deformations.

SUMMARY

The system described below allows an untrained user with a PC and an ordinary camera to create and instantly animate his/her face model in no more than a few minutes. The user interface for the process comprises three simple steps. First, the user is instructed to pose for two still images. The user is then instructed to turn his/her head horizontally, first in one direction and then the other. Third, the user is instructed to identify a few key points in the images. Then the system computes the 3D face geometry from the two images, and tracks the video sequences, with reference to the computed 3D face geometry, to create a complete facial texture map by blending frames of the sequence.

To overcome the difficulty of extracting 3D facial geometry from two images, the system matches a sparse set of corners and uses them to compute head motion and the 3D locations of these corner points. The system then fits a linear class of human face geometries to this sparse set of reconstructed corners to generate the complete face geometry. Linear classes of face geometry and image prototypes have previously been demonstrated for constructing 3D face models from images in a morphable model framework. Below, we show that linear classes of face geometries can be used to effectively fit/interpolate a sparse set of 3D reconstructed points. This novel technique allows the system to quickly generate photorealistic 3D face models with minimal user intervention.

DETAILED DESCRIPTION

The following description sets forth a specific embodiment of a 3D modeling system that incorporates elements recited in the appended claims. The embodiment is described with specificity in order to meet statutory requirements. However, the description itself is not intended to limit the scope of this patent. Rather, the claimed invention might eventually be embodied in other ways, to include different elements or combinations of elements similar to the ones described in this document, in conjunction with other present or future technologies.

System Overview

Figure 1:
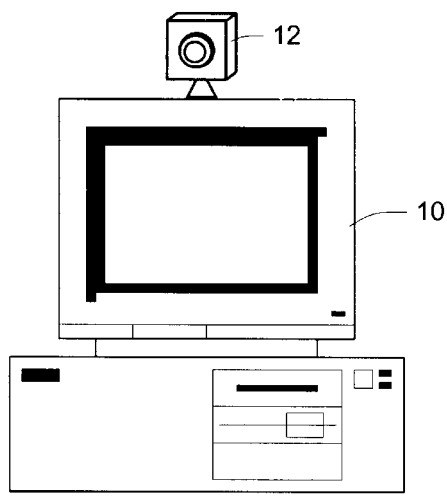
FIG. 1 is a block diagram of a computer system capable of performing the operations described below.

FIG. 1 shows components of our system. The equipment includes a computer 10 and a video camera 12. The computer is a typical desktop, laptop, or similar computer having various typical components such as a keyboard/mouse, display, processor, peripherals, and computer-readable media on which an operating system and application programs are stored and from which the operating system and application programs are executed. Such computer-readable media might include removable storage media, such as floppy disks, CDROMs, tape storage media, etc. The application programs in this example include a graphics program designed to perform the various techniques and actions described below.

The video camera is an inexpensive model such as many that are widely available for Internet videoconferencing. We assume the intrinsic camera parameters have been calibrated, a reasonable assumption given the simplicity of calibration procedures [36].

Data Capture

The first stage is data capture. The user takes two images with a small relative head motion, and two video sequences: one with the head turning to each side. Alternatively, the user can simply turn his/her head from left all the way to the right, or vice versa. In that case, the user needs to select one approximately frontal view while the system automatically selects the second image and divides the video into two sequences. In the seque, we call the two images the base images.

Figure 2:
FIG. 2 illustrates how to mark facial features on an image.

The user then locates five markers in each of the two base images. As shown in FIG. 2, the five markers correspond to the two inner eye corners 20, nose tip 21, and two mouth corners 22.

The next processing stage computes the face mesh geometry and the head pose with respect to the camera frame using the two base images and markers as input.

The final stage determines the head motions in the video sequences, and blends the images to generate a facial texture map.

Notation

We denote the homogeneous coordinates of a vector x by $\tilde{x}$, i.e., the homogeneous coordinates of an image point $m=(u, v)^T$ are $\tilde{m}=(u, v, 1)^T$, and those of a 3D point $p=(x, y, z)^T$ are $\tilde{p}=(x, y, z, 1)^T$. A camera is described by a pinhole model, and a 3D point p and its image point m are related by $$\lambda \tilde{m} = AP\Omega\tilde{p}$$

where $\lambda$ is a scale, and A, P, and $\Omega$ are given by $$A = \begin{pmatrix} \alpha & \lambda & u_0 \\ 0 & \beta & v_0 \\ 0 & 0 & 1 \end{pmatrix} \quad P = \begin{pmatrix} 1 & 0 & 0 & 0 \\ 0 & 1 & 0 & 0 \\ 0 & 0 & 1 & 0 \end{pmatrix} \quad \Omega = \begin{pmatrix} R & t \\ 0^T & 1 \end{pmatrix}$$

The elements of matrix A are the intrinsic parameters of the camera and matrix A maps the normalized image coordinates to the pixel image coordinates (see e.g. [7]). Matrix P is the perspective projection matrix. Matrix $\Omega$ is the 3D rigid transformation (rotation R and translation t) from the object/world coordinate system to the camera coordinate system. When two images are concerned, a prime ' is added to denote the quantities related to the second image.

The fundamental geometric constraint between two images is known as the epipolar constraint [7, 35]. It states that in order for a point m in one image and a point m' in the other image to be the projections of a single physical point in space, or in other words, in order for them to be matched, they must satisfy $$\tilde{m}'^T A'^{-T} E A^{-1} \tilde{m} = 0$$

where $E=[t_r]_x R_r$ is known as the essential matrix, $(R_r, t_r)$ is the relative motion between the two images, and $[t_r]_x$ is a skew symmetric matrix such that $t_r \times v = [t_r]_x v$ for any 3D vector v.

Linear Class of Face Geometries

Instead of representing a face as a linear combination of real faces or face models, we represent it as a linear combination of a neutral face model and some number of face metrics, where a metric is a deformation vector that linearly deforms a face in a certain way, such as to make the head wider, make the nose bigger, etc. Each deformation vector specifies a plurality of displacements corresponding respectively to the plurality of 3D points of the neutral face model.

To be more precise, let's denote the face geometry by a vector $S=(v_1^T, \ldots v_n^T)^T$, where $v_i=(X_i, Y_i, Z_i)^T$, (i=1, ... n) are the vertices, and a metric by a vector $M=(\delta v_1, \ldots, \delta v_n)^T$, where $\delta v_i=(\delta X_i, \delta Y_i, \delta Z_i)^T$. Given a neutral face $S^0=(v_1^{0T}, \ldots v_n^{0T})^T$, and a set of m metrics $M^j=(\delta v_1^{jT}, \ldots \delta v_n^{jT})^T$, the linear space of face geometries spanned by these metrics is $$S = S^0 + \sum_{j=1}^{m} c_j M^j \text{ subject to } c_j \in [l_j, u_j]$$

where $c_j$'s are the metric coefficients and $l_j$ and $u_j$ are the valid range of $c_j$. In our implementation, the neutral face and all the metrics are designed by an artist, and it is done only once. The neutral face contains 194 vertices and 360 triangles. There are 65 metrics.

Image Matching and 3D Reconstruction

We now describe our techniques to determine the face geometry from just two views. The two base images are taken in a normal room by a static camera while the head is moving in front. There is no control on the head motion, and the motion is unknown. We have to determine first the motion of the head and match some pixels across the two views before we can fit an animated face model to the images. However, some preprocessing of the images is necessary.

Determining Facial Portions of the Images

Figure 3:
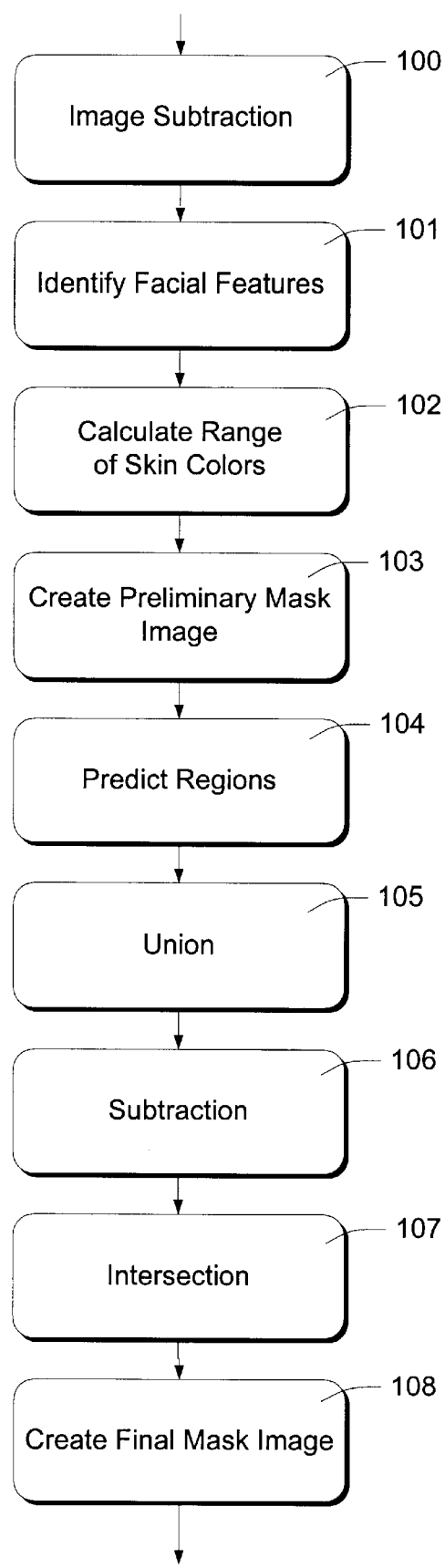
FIGS. 3, 5, 6 are flow charts showing sequences of actions for creating a 3D face model.

FIG. 3 shows actions performed to distinguish a face in the two selected images from other portions of the images.

There are at least three major groups of objects undergoing different motions between the two views: background, head, and other parts of the body such as the shoulder. If we do not separate them, there is no way to determine a meaningful head motion, since the camera is static, we can expect to remove the background by subtracting one image from the other. However, as the face color changes smoothly, a portion of the face may be marked as background. Another problem with the image subtraction technique is that the moving body and the head cannot be distinguished.

An initial step 100 comprises using image subtraction to create a first mask image, in which pixels having different colors in the two base images are marked.

A step 101 comprises identifying locations of a plurality of distinct facial features in the base images. In this example, the user does this manually, by marking the eyes, nose, and mouth, as described above and shown in FIG. 2. Automated techniques could also be used to identify these points.

A step 102 comprises calculating a range of skin colors by sampling the base images at the predicted portions, or at locations that are specified relative to the user-indicated locations of the facial features. This allows us to build a color model of the face skin. We select pixels below the eyes and above the mouth, and compute a Gaussian distribution of their colors in the RGB space. If the color of a pixel matches this face skin color model, the pixel is marked as a part of the face.

A step 103 comprises creating a second mask image that marks any image pixels having colors corresponding to the calculated one or more skin colors.

Either union or intersection of the two mask images is not enough to locate the face because it will include either too many (e.g., including undesired moving body) or too few (e.g., missing desired eyes and mouth) pixels. Since we already have information about the position of eye corners and mouth corners, we initially predict the approximate boundaries of the facial portion of each image, based on the locations identified by the user. More specifically, step 104 comprises predicting an inner area and an outer area of the image. The outer area corresponds roughly to the position of the subject's head in the image, while the inner area corresponds roughly to the facial portion of the head.

Figure 4:
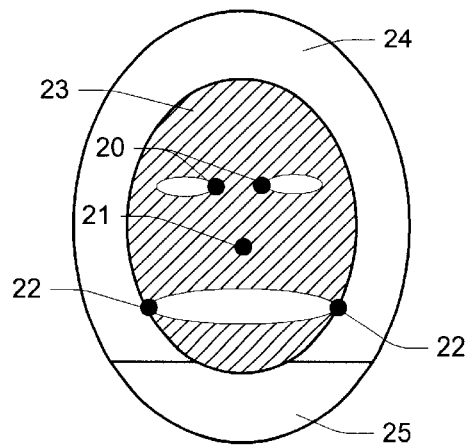
FIG. 4 shows the selection of different head regions as described below.

FIG. 4 shows these areas, which are defined as ellipses. The inner ellipse 23 covers most of the face, while the outer ellipse 24 is usually large enough to enclose the whole head. Let $d_e$ be the image distance between the two inner eye corners, and $d_{em}$, the vertical distance between the eyes and the mouth. The width and height of the inner ellipse are set to $5d_e$ and $3d_{em}$. The outer ellipse is 25% larger than the inner one.

In addition, step 104 includes predicting or defining a lower area of the image that corresponds to a chin portion of the head. The lower area aims at removing the moving body, and is defined to be $0.6d_{em}$ below the mouth.

Within the inner ellipse, a "union" or "joining" operation 105 is used: we note all marked pixels in the first mask image and also any unmarked pixels of the first mask image that correspond in location to marked pixels in the second mask image. Between the inner and outer ellipses (except for the lower region), the first mask image is selected (106): we note all marked pixels in the first mask image. In the lower part, we use an "intersection" operation 107: we note any marked pixels in the first mask image that correspond in location to marked pixels in the second mask image.

The above steps result in a final mask image (108) that marks the noted pixels as being part of the head.

Corner Matching and Motion Determination

One popular technique of image registration is optical flow [12, 2], which is based on the assumption that the intensity/color is conserved. This is not the case in our situation: the color of the same physical point appears to be different in images because the illumination changes when the head is moving. We therefore resort to a feature-based approach that is more robust to intensity/color variations. It consists of the following steps: (i) detecting corners in each image; (ii) matching corners between the two images; (iii) detecting false matches based on a robust estimation technique; (iv) determining the head motion; (v) reconstructing matched points in 3D space.

Figures 5, 6:
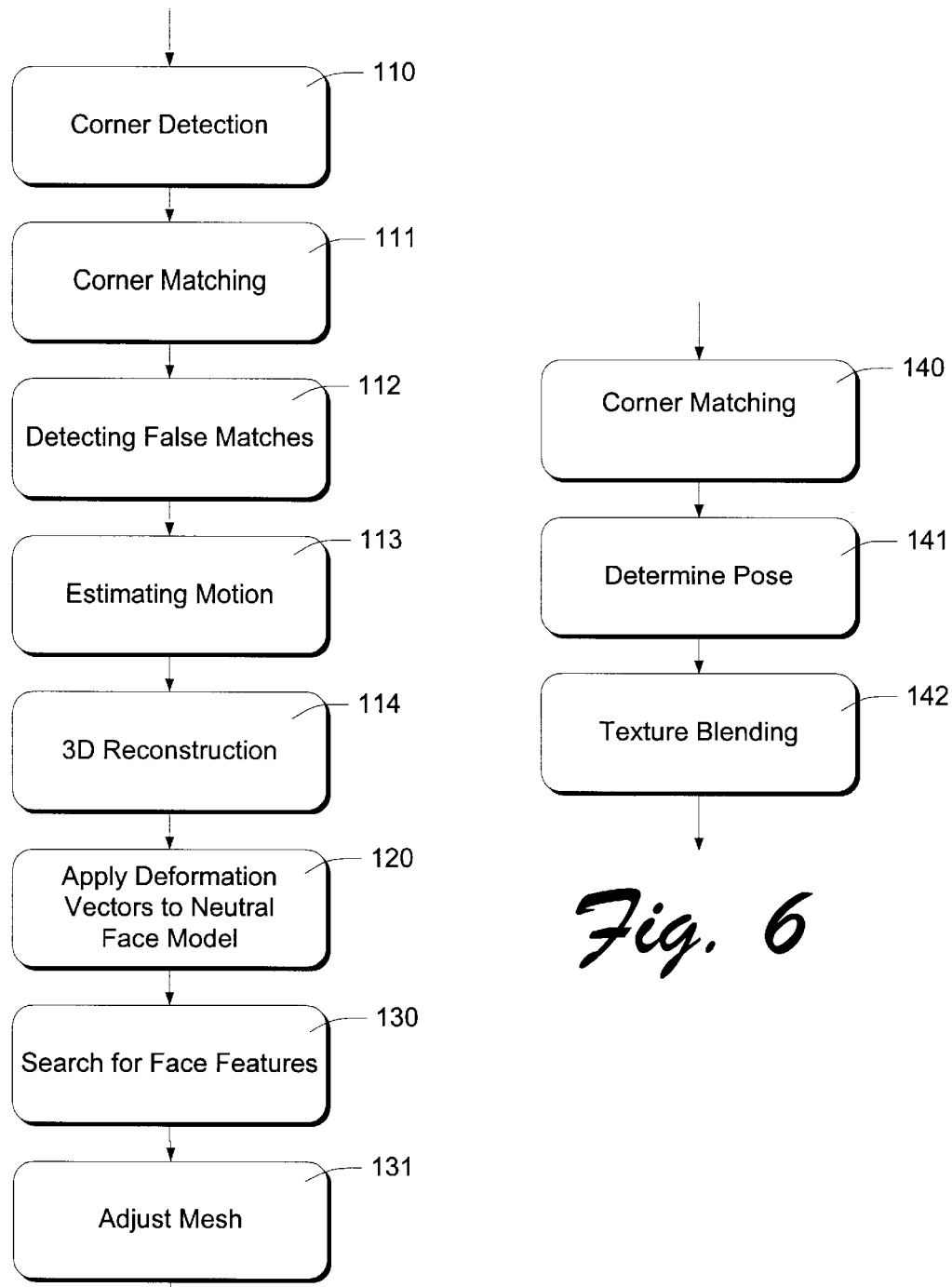

FIG. 5 shows the sequence of operations.

Corner Detection

In a step 110, we use the Plessey corner detector, a well-known technique in computer vision [10]. It locates corners corresponding to high curvature points in the intensity surface if we view an image as a 3D surface with the third dimension being the intensity. Only corners whose pixels are white in the mask image are considered.

Corner Matching

In a step 111, for each corner in the first image we choose an 11×11 window centered on it, and compare the window with windows of the same size, centered on the corners in the second image. A zero-mean normalized cross correlation between two windows is computed [7]. If we rearrange the pixels in each window as a vector, the correlation score is equivalent to the cosine angle between two intensity vectors. It ranges from −1, for two windows which are not similar at all, to 1, for two windows which are identical. If the largest correlation score exceeds a prefixed threshold (0.866 in our case), then that corner in the second image is considered to be the match candidate of the corner in the first image. The match candidate is retained as a match if and only if its match candidate in the first image happens to be the corner being considered. This symmetric test reduces many potential matching errors.

False Match Detection

Operation 112 comprises detecting and discarding false matches. The set of matches established so far usually contains false matches because correlation is only a heuristic. The only geometric constraint between two images is the epipolar constraint $\tilde{m}'^T A'^{-T} E A^{-1} \tilde{m} = 0$. If two points are correctly matched, they must satisfy this constraint, which is unknown in our case. Inaccurate location of corners because of intensity variation of lack of string texture features is another source of error. In a step 109, we use the technique described in [35] to detect both false matches and poorly located corners and simultaneously estimate the epipolar geometry (in terms of the essential matrix E). That technique is based on a robust estimation technique known as the least median squares [28], which searches in the parameter space to find the parameters yielding the smallest value for the median of squared residuals computer for the entire data set.

Consequently, it is able to detect false matches in as many as 49.9% of the whole set of matches.

Motion Estimation

In a step 113, we compute an initial estimate of the relative head motion between two images, denoted by rotation $R_r$ and translation $t_r$. If the image locations of the identified feature points are precise, one could use a five-point algorithm to compute camera motion from Matrix E [7, 34]. Motion $(R_r, t_r)$ is then re-estimated with a nonlinear least-squares technique using all remaining matches after having discarded the false matches [34].

However, the image locations of the feature point are not usually precise. A human typically cannot mark the feature points with high precision. An automatic facial feature detection algorithm may not produce perfect results. When there are errors, a five-point algorithm is not robust even when refined with a well-known bundle adjustment technique.

For each of the five feature points, its 3D coordinates (x, y, z) coordinates need to be determined—fifteen (15) unknowns. Then, motion vector $(R_r, t_r)$ needs to be determined—adding six (6) more unknowns. One unknown quantity is the magnitude, or global scale, which will never be determined from images alone. Thus, the number of unknown quantities that needs to be determined is twenty (i.e., 15+6−1=20). The calculation of so many unknowns further reduces the robustness of the five point-tracking algorithm.

To substantially increase the robustness of the five point algorithm, a new set of parameters is created. These parameters take into consideration physical properties of the feature points. The property of symmetry is used to reduce the number of unknowns. Additionally, reasonable lower and upper bounds are placed on nose height and are represented as inequality constraints. As a result, the algorithm becomes more robust. Using these techniques, the number of unknowns is significantly reduced below 20.

Even though the following algorithm is described with respect to five feature points, it is straightforward to extend the idea to any number of feature points less than or greater than five feature points for improved robustness. Additionally, the algorithm can be applied to other objects besides a face as long as the other objects represent some level of symmetry. Head motion estimation is first described with respect to five feature points. Next, the algorithm is extended to incorporate other image point matches obtained from image registration methods.

Head Motion Estimation from Five Feature Points

Figure 7:
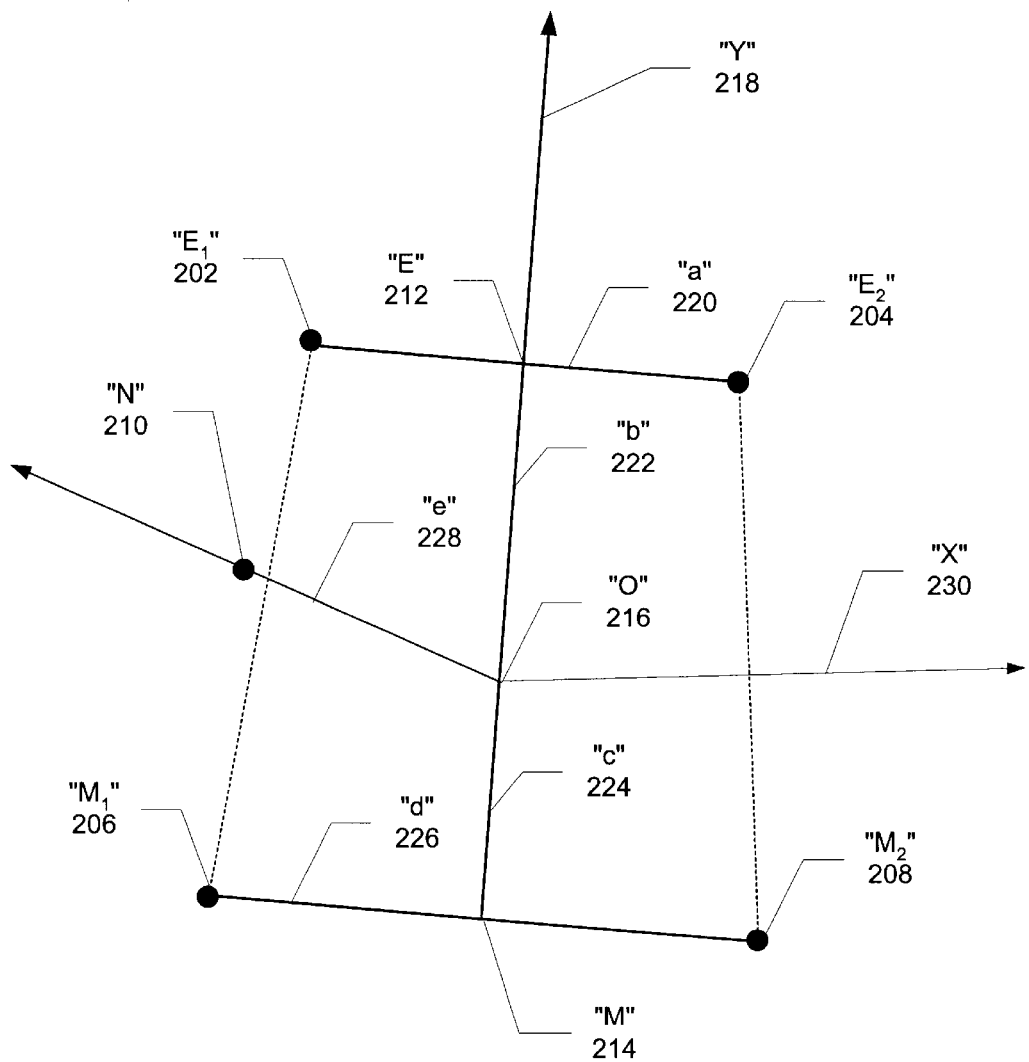
FIG. 7 illustrates a coordinate system that is based on symmetry between selected feature points on an image.

FIG. 7 illustrates the new coordinate system used to represent feature points. $E_1$ 202, $E_2$ 204, $M_1$ 206, $M_2$ 208, and N 210 denote the left eye corner, right eye corner, left mouth corner, right mouth corner, and nose top, respectively. A new point E 212 denotes the midpoint between eye corners $E_1$, $E_2$ and a new point M 214 identifies the midpoint between mouth corners $M_1$, $M_2$. Notice that human faces exhibit some strong structural properties. For example, the left and right sides of a human face are very close to being symmetrical about the nose. Eye corners and mouth corners are almost coplanar. Based on these symmetrical characteristics, the following reasonable assumptions are made:

(1) A line $E_1E_2$ connecting the eye corners $E_1$ and $E_2$ is parallel to a line $M_1M_2$ connecting the mouth corners.

(2) A line centered on the nose (e.g., line EOM when viewed straight on or lines NM or NE when viewed from an angle as shown) is perpendicular to mouth line $M_1M_2$ and to eye line $E_1E_2$.

Let $\pi$ be the plane defined by $E_1$, $E_2$, $M_1$ and $M_2$. Let O 216 denote the projection of point N on plane $\pi$. Let $\Omega_0$ denote the coordinate system, which is originated at O with ON as the z-axis, OE as the y-axis; the x-axis is defined according to the right-hand system. In this coordinate system, based on the assumptions mentioned earlier, we can define the coordinates of $E_1$, $E_2$, $M_1$, $M_2$, N as $(-a, b\ 0)^T$, $(a, b, 0)^T$, $(-d, -c, 0)^T$, $(d, -c, 0)^T$, $(0, 0, e)^T$, respectively.

By redefining the coordinate system, the number of parameters used to define five feature points is reduced from nine (9) parameters for generic five points to five (5) parameters for five feature points in this local coordinate system.

Let t denote the coordinates of O under the camera coordinate system, and R the rotation matrix whose three columns are vectors of the three coordinate axis of $\Omega_0$. For each point $p \in \{E_1, E_2, M_1, M_2, N\}$, its coordinate under the camera coordinate system is Rp+t. We call (R, t) the head pose transform. Given two images of the head under two different poses (assume the camera is static), let (R, t) and (R', t') be their head pose transforms. For each point $p_i \in \{E_1, E_2, M_1, M_2, N\}$, if we denote its image point in the first view by $m_i$ and that in the second view by $m'_i$, we have the following equations:

$$proj(Rp_i+t)=m_i \qquad (1)$$

and $$proj(R'p_i+t')=m'_i \qquad (2)$$

where proj is the perspective projection. Notice that we can fix one of the coordinates a, b, c, d, since the scale of the head size cannot be determined from the images. As is well known, each pose has six (6) degrees of freedom. Therefore, the total number of unknowns is sixteen (16), and the total number of equations is 20. If we instead use their 3D coordinates as unknowns as in any typical bundle adjustment algorithms, we would end up with 20 unknowns and have the same number of equations. By using the generic properties of the face structure, the system becomes overconstrained, making the pose determination more robust.

To make the system even more robust, we add an inequality constraint on e. The idea is to force e to be positive and not too large compared to a, b, c, d. In the context of the face, the nose is always out of plane $\pi$. In particular, we use the following inequality:

$$0 \leq e \leq 3a \qquad (3)$$

Three (3) is selected as the upper bound of e/a simply because it seems reasonable and it works well. The inequality constraint is finally converted to equality constraint by using a penalty function.

$$P_{nose} = \begin{cases} e*e & \text{if } e < 0 \\ 0 & \text{if } 0 \leq e \leq 3a \\ (e-3a)*(e-3a) & \text{if } e > 3a \end{cases} \qquad (4)$$

In summary, based on equations (1), (2) and (4), we estimate a, b, c, d, e, (R, t) and (R', t') by minimizing $$F_{5pts} = \sum_{i=1}^{5} w_i (\|m_i - proj(Rp_i + t)\|^2 + \qquad (5)$$

$$\|m'_i - proj(R' p_i + t')\|^2) + w_n P_{nose}$$

where $w_i$'s and $w_n$ are the weighting factors, reflecting the contribution of each term. In our case, $w_i=1$ except for the nose term which has a weight of 0.5 because it is usually more difficult to locate the nose top than other feature points. The weight for penalty $w_n$ is set to 10. The objective function (5) is minimized using a Levenberg-Marquardt method [40]. More precisely, as mentioned earlier, we set a to a constant during minimization since the global head size cannot be determined from images.

Incorporating Image Point Matches

If we estimate camera motion using only the five user marked points, the result is sometimes not very accurate because the markers contain human errors. In this section, we describe how to incorporate the image point matches (obtained by any feature matching algorithm) to improve precision.

Let $(m_j, m'_j)$ $(j=1 \ldots K)$ be the K point matches, each corresponding to the projections of a 3D point $p_j$ according to the perspective projection (1) and (2). 3D points $p_j$'s are unknown, so they are estimated. Assuming that each image point is extracted with the same accuracy, we can estimate $a, b, c, d, e, (R, t), (R', t')$, and $\{p_j\}$ $(j=1 \ldots K)$ by minimizing $$F = F_{5pts} + w_p \sum_{j=1}^{K} (\|m_j - proj(Rp_j + t)\|^2 + \qquad (6)$$

$$\|m'_j - proj(R' p_j + t')\|^2)$$

where $F_{5pts}$ is given by (5), and $w_p$ is the weighting factor. We set $w_p=1$ by assuming that the extracted points have the same accuracy as those of eye corners and mouth corners. The minimization can again be performed using a Levenberg-Marquardt method. This is a quite large minimization problem since we need to estimate $16+3$ K unknowns, and therefore it is computationally quite expensive especially for large K. Fortunately, as shown in [37], we can eliminate the 3D points using a first order approximation. The following term $$\|m_j - proj(Rp_j + t)\|^2 + \|m'_j - proj(R' p_j + t')\|^2$$

can be shown to be equal, under the first order approximation, to $$\frac{(\tilde{m}'^T_j E \tilde{m}_j)^2}{\tilde{m}'^T_j E^T ZZ^T E \tilde{m}_j + \tilde{m}'^T_j E^T ZZ^T E \tilde{m}'_j}$$

where $$\tilde{m}_j = [m_j^T, 1]^T, \tilde{m}'_j = [\tilde{m}'^T_j, 1]^T, Z = \begin{bmatrix} 1 & 0 \\ 0 & 1 \\ 0 & 0 \end{bmatrix},$$

and E is the essential matrix to defined below.

Let $(R_r, t_r)$ be the relative motion between two views. It is easy to see that $$R_r = R'R^T,$$

and $$t_r = t' - R'R^T t.$$

Furthermore, let's define a 3×3 antisymmetric matrix $[t_r]_x$ such that $[t_r]_x x = t_r \times x$ for any 3D vector x. The essential matrix is then given by $$E = [t_r]_x R_r \qquad (7)$$

which describes the epipolar geometry between two views [7].

In summary, the objective function (6) becomes $$F = F_{5pts} + w_p \sum_{j=1}^{K} \frac{(\tilde{m}'^T_j E \tilde{m}_j)^2}{\tilde{m}'^T_j E^T ZZ^T E \tilde{m}_j + \tilde{m}'^T_j E^T ZZ^T E \tilde{m}'_j} \qquad (8)$$

Notice that this is a much smaller minimization problem. We only need to estimate 16 parameters as in the five-point problem (5), instead of $16+3$ K unknowns.

To obtain a good initial estimate, we first use only the five feature points to estimate the head motion by using the algorithm described in Section 2. Thus we have the following two step algorithm:

Step1. Set $w_p=0$. Solve minimization problem 8.
Step2. Set $w_p=1$. Use the results of step1 as the initial estimates. Solve minimization problem (8).

Notice that we can apply this idea to the more general cases where the number of feature points is not five. For example, if there are only two eye corners and mouth corners, we'll end up with 14 unknowns and $16+3$ K equations. Other symmetric feature points (such as the outside eye corners, nostrils, and the like) can be added into equation 8 in a similar way by using the local coordinate system $\Omega_0$.

Head Motion Estimation Results

In this section, we show some test results to compare the new algorithm with the traditional algorithms. Since there are multiple traditional algorithms, we chose to implement the algorithm as described in [34]. It works by first computing an initial estimate of the head motion from the essential matrix [7], and then re-estimate the motion with a nonlinear least-squares technique.

We have run both the traditional algorithm and the new algorithm on many real examples. We found many cases where the traditional algorithm fails while the new algorithm successfully results in reasonable camera motions. When the traditional algorithm fails, the computed motion is completely bogus, and the 3D reconstructions give meaningless results. But the new algorithm gives a reasonable result. We generate 3D reconstructions based on the estimated motion, and perform Delauney triangulation.

We have also performed experiments on artificially generated data. We arbitrarily select 80 vertices from a 3D face model and project its vertices on two views (the head motion is eight degrees apart). The image size is 640 by 480 pixels. We also project the five 3D feature points (eye corners, nose top, and mouth corners) to generate the image coordinates of the markers. We then add random noises to the coordinates (u, v) of both the image points and the markers. The noises are generated by a pseudo-random generator subject to Gausian distribution with zero mean and variance ranging from 0.4 to 1.2. We add noise to the marker's coordinates as well. The results are plotted in FIG. 3. The blue curve shows the results of the traditional algorithm and the red curve shows the results of our new algorithm. The horizontal axis is the variance of the noise distribution. The vertical axis is the difference between the estimated motion and the actual motion. The translation vector of the estimated motion is scaled so that its magnitude is the same as the actual motion. The difference between two rotations is measured as the Euclidean distance between the two rotational matrices.

We can see that as the noise increases, the error of the traditional algorithm has a sudden jump at certain point. But, the errors of our new algorithm grow much more slowly.

3D Reconstruction

In a step 114, matched points are reconstructed in 3D space with respect to the camera frame at the time when the first base image was taken. Let (m, m') be a couple of matched points, and p be their corresponding point in space. 3D point p is estimated such that $\|m-\hat{m}\|^2+\|m'-\hat{m}'\|^2$ is minimized, where $\hat{m}$ and $\hat{m}'$ are projections of p in both images according to the equation $\lambda \tilde{m}=AP\Omega \tilde{p}$.

3D positions of the markers are determined in the same way.

Fitting a Face Model

This stage of processing creates a 3D model of the face. The face model fitting process consists of two steps: fitting to 3D reconstructed points and fine adjustment using image information.

3D Fitting

A step 120 comprises constructing a realistic 3D face model from the reconstructed 3D image calculated in step 111. Given a set of reconstructed 3D points from matched corners and markers, the fitting process applies a combination of deformation vectors to a pre-specified, neutral face model, to deform the neutral face model approximately to the reconstructed face model. The technique searches for both the pose of the face and the metric coefficients to minimize the distances from the reconstructed 3D points to the neutral face mesh.

The pose of the face is the transformation $$T = \begin{pmatrix} sR & t \\ 0^T & 1 \end{pmatrix}$$

from the coordinate frame of the neutral face mesh to the camera frame, where R is a 3×3 rotation matrix, t is a translation, and s is a global scale. For any 3D vector p, we use notation T(p)=sRp+t.

The vertex coordinates of the face mesh in the camera frame is a function of both the metric coefficients and the pose of the face. Given metric coefficients $(c_1, \ldots, c_m)$ and pose T, the face geometry in the camera frame is given by $$S = T\left(S^0 + \sum_{i=1}^{n} c_i M^i\right)$$

Since the face mesh is a triangular mesh, any point on a triangle is a linear combination of the three triangle vertexes in terms of barycentric coordinates. So any point on a triangle is also a function of T and metric coefficients. Furthermore, when T is fixed, it is simply a linear function of the metric coefficients.

Let $(p_1, p_2, \ldots, p_k)$ be the reconstructed corner points, and $(q_1, q_2, \ldots, q_5)$ be the reconstructed markers. Denote the distance from $p_i$ to the face mesh S by $d(p_i, S)$. Assume marker $q_j$ corresponds to vertex $v_{m_j}$ of the face mesh, and denote the distance between $q_j$ and $v_{m_j}$ by $d(q_j, v_{m_j})$. The fitting process consists of finding pose T and metric coefficients $\{c_1, \ldots, c_n\}$ by minimizing $$\sum_{i=1}^{n} w_i d^2(p_1, S) + \sum_{j=1}^{5} d^2(q_j, v_{m_j})$$

where $w_i$ is a weighting factor.

To solve this problem, we use an iterative closest point approach. At each iteration, we first fix T. For each $p_i$, we find the closest point $g_i$ on the current face mesh S. We then minimize $\Sigma w_i d^2(p_i, S) + \Sigma d^2(q_j, v_{m_j})$. We set $w_i$ to be 1 at the first iteration and $1.0/1+d^2(p_i, g_i)$ in the subsequent iterations. The reason for using weights is that the reconstruction from images is noisy and such a weight scheme is an effective way to avoid overfitting to the noisy data [8]. Since both $g_i$ and $v_{m_j}$ are linear functions of the metric coefficients for fixed T, the above problem is a linear least square problem. We then fix the metric coefficients, and solve for the pose. To do that, we recompute $g_i$ using the new metric coefficients. Given a set of 3D corresponding points $(p_i, g_i)$ and $(q_j, v_{m_j})$, there are well known algorithms to solve for the pose. We use the quaternion-based technique described in [11]. To initialize this iterative process, we first use the 5 markers to compute an initial estimate of the pose. In addition, to get a reasonable estimate of the head size, we solve for the head-size related metric coefficients such that the resulting face mesh matches the bounding box of the reconstructed 3D points. Occasionally, the corner matching algorithm may produce points not on the face. In that case, the metric coefficients will be out of the valid ranges, and we throw away the point that is the most distant from the center of the face. We repeat this process until metric coefficients become valid.

Fine Adjustment Using Image Information

After the geometric fitting process, we have now a face mesh that is a close approximation to the real face. To further improve the result, we perform a search 130 for silhouettes and other face features in the images and use them to refine the face geometry. The general problem of locating silhouettes and face features in images is difficult, and is still a very active research area in computer vision. However, the face mesh that we have obtained provides a good estimate of the locations of the face features, so we only need to perform search in a small region.

We use the snake approach [15] to compute the silhouettes of the face. The silhouette of the current face mesh is used as the initial estimate. For each point on this piecewise linear curve, we find the maximum gradient location along the normal direction within a small range (10 pixels each side in our implementation). Then we solve for the vertexes (acting as control points) to minimize the total distance between all the points and their corresponding maximum gradient locations.

We use a similar approach to find the upper lips.

To find the outer eye corner (not marked), we rotate the current estimate of that eye corner (given by the face mesh)

around the marked eye corner by a small angle, and look for the eye boundary using image gradient information. This is repeated for several angles, and the boundary point that is the most distant to the marked corner is chosen as the outer eye corner.

We could also use the snake approach to search for eyebrows. However, our current implementation uses a slightly different approach. Instead of maximizing image gradients across contours, we minimize the average intensity of the image area that is covered by the eyebrow triangles. Again, the vertices of the eyebrows are only allowed to move in a small region bounded by their neighboring vertices. This has worked very robustly in our experiments.

We then use the face features and the image silhouettes as constraints in our system to further improve the mesh, in a step 131. Notice that each vertex on the mesh silhouette corresponds to a vertex on the image silhouette. We cast a ray from the camera center through the vertex on the image silhouette. The projection of the corresponding mesh vertex on this ray acts as the target position of the mesh vertex. Let v be the mesh vertex and h the projection. We have equation v=h. For each face feature, we obtain an equation in a similar way. These equations are added to equation (5). The total set of equations is solved as before, i.e., we first fix the post T and use a linear least square approach to solve the metric coefficients, and then fix the metric coefficients while solving for the pose.

Face Texture From Video Sequence

Now we have the geometry of the face from only two views that are close to the frontal position. For the sides of the face, the texture from the two images is therefore quite poor or even not available at all. Since each image only covers a portion of the face, we need to combine all the images in the video sequence to obtain a complete texture map. This is done by first determining the head pose for the images in the video sequence and then blending them to create a complete texture map.

Determining Head Motions in Video Sequences

FIG. 6 shows operations in creating a texture map. In an operation 140, successive images are first matched using the same corner detection, corner matching, and false match detection techniques described above. We could combine the resulting motions incrementally to determine the head pose. However, this estimation is quite noisy because it is computed only from 2D points. As we already have the 3D face geometry, a more reliable pose estimation can be obtained by combining both 3D and 2D information, as follows.

In an operation 141, the pose of each successive image is determined. Let us denote the first base image by $I_0$. This base image comprises one of the two initial still images, for which the pose is already known. Because we know the pose of the base image, we can determine the 3D position of each point in the base image relative to the facial model that has already been computed.

We will denote the images on the video sequences by $I_1, \ldots, I_v$. The relative head motion from $I_{i-1}$ to $I_i$ is given by $$R = \begin{pmatrix} R_{ri} & t_{ri} \\ 0^T & 1 \end{pmatrix},$$

and the head pose corresponding to image $I_i$ with respect to the camera frame is denoted by $\Omega_i$. The technique works incrementally, starting with $I_0$ and $I_1$. For each pair of images ($I_{i-1}$, $I_i$), we perform a matching operation to match points of image $I_i$ with corresponding points in $I_{i-1}$. This operation uses the corner matching algorithm described above. We then perform a minimization operation, which calculates the pose of $I_i$ such that projections of 3D positions of the matched points of $I_{i-1}$ onto $I_i$ coincide approximately with the corresponding matched points of $I_i$. More specifically, the minimization operation minimizes differences between the projections of 3D positions of the matched points of $I_{i-1}$ onto $I_i$ and the corresponding matched points of $I_i$. Let us denote the matched corner pairs as $\{(m_j, m'_j) | j=1, \ldots, l\}$. For each $m_j$ in $I_{i-1}$, we cast a ray from the camera center through $m_j$, and compute the intersection $x_j$ of that ray with the face mesh corresponding to image $I_{i-1}$. According to the equation $\lambda \tilde{m} = AP\Omega\tilde{p}$, $R_i$ is subject to the following equations $$APR_i\tilde{x}_j = \lambda_j \tilde{m}'_j \text{ for } j=1, \ldots, l$$

where A, P, $x_j$ and $m'_j$ are known. Each of the above equations gives two constraints on $R_i$. We compute $R_i$ with a technique described in [7], which minimizes the sum of differences between each pair of matched points $(m_j, m'_j)$. After $R_i$ is computed, the head pose for image $I_i$ in the camera frame is given by $\Omega_i = R_i \Omega_{i-1}$. The head pose $\Omega_0$ is known from previous calculations involving the two still images.

In general, it is inefficient to use all the images in the video sequence for texture blending, because head motion between two consecutive frames is usually very small. To avoid unnecessary computation, the following process is used to automatically select images from the video sequence. Let us call the amount of rotation of the head between two consecutive frames the rotation speed. If s is the current rotation speed and α is the desired angle between each pair of selected images, the next image is selected α/s frames away. In our implementation, the initial guess of the rotation speed is set to 1 degree/frame and the desired separation angle is equal to 5 degrees.

Texture Blending

Operation 142 is a texture blending operation. After the head pose of an image is computed, we use an approach similar to Pighin et al.'s method [26] to generate a view independent texture map. We also construct the texture map on a virtual cylinder enclosing the face model. But instead of casting a ray from each pixel to the face mesh and computing the texture blending weights on a pixel by pixel basis, we use a more efficient approach. For each vertex on the face mesh, we computed the blending weight for each image based on the angle between surface normal and the camera direction [26]. If the vertex is invisible, its weight is set to 0.0. The weights are then normalized so that the sum of the weights over all the images is equal to 1.0. We then set the colors of the vertexes to be their weights, and use the rendered image of the cylindrical mapped mesh as the weight map. For each image, we also generate a cylindrical texture map by rendering the cylindrical mapped mesh with the current image as texture map. Let $C_i$ and $W_i$ (I=1, ..., k) be the cylindrical texture maps and the weight maps. Let D be the final blended texture map. For each pixel (u, v), its color on the final blended texture map is $$C(u, v) = \sum_{i=1}^{k} W_i(u, v) C_i(u, v).$$

Because the rendering operations can be done using graphics hardware, this approach is very fast.

User Interface

We have built a user interface to guide the user through collecting the required images and video sequences, and marking two images. The generic head model without texture is used as a guide. Recorded instructions are lip-synced with the head directing the user to first look at a dot on the screen and push a key to take a picture. A second dot appears and the user is asked to take the second still image. The synthetic face mimics the actions the user is to follow. After the two still images are taken, the guide directs the user to slowly turn his/her head to record the video sequences. Finally, the guide places red dots on her own face and directs the user to do the same on the two still images. The collected images and markings are then processed and a minute or two later they have a synthetic head that resembles them.

Animation

Having obtained the 3D textured face model, the user can immediately animate the model with the application of facial expressions including frowns, smiles, mouth open, etc.

To accomplish this we have defined a set of vectors, which we call posemes. Like the metric vectors described previously, posemes are a collection of artist-designed displacements. We can apply these displacements to any face as long as it has the same topology as the neutral face. Posemes are collected in a library of actions and expressions.

The idle motions of the head and eyeballs are generated using Perlin's noise functions [24, 25].

Results

We have used our system to construct face models for various people. No special lighting equipment or background is required. After data capture and marking, the computations take between 1 and 2 minutes to generate the synthetic textured head. Most of this time is spent tracking the video sequences.

For people with hair on the sides or the front of the face, our system will sometimes pick up corner points on the hair and treat them as points on the face. The reconstructed model may be affected by them. For example, a subject might have hair lying down over his/her forehead, above the eyebrows. Our system treats the points on the hair as normal points on the face, thus the forehead of the reconstructed model is higher than the real forehead.

In some animations, we have automatically cut out the eye regions and inserted separate geometries for the eyeballs. We scale and translate a generic eyeball model. In some cases, the eye textures are modified manually by scaling the color channels of a real eye image to match the face skin colors. We plan to automate this last step shortly.

Even though the system is quite robust, it fails sometimes. We have tried our system on twenty people, and our system failed on two of them. Both people are young females with very smooth skin, where the color matching produces too few matches.

Perspectives

Very good results obtained with the current system encourage us to improve the system along three directions. First, we are working at extracting more face features from two images, including the lower lip and nose.

Second, face geometry is currently determined from only two views, and video sequences are used merely for creating a complete face texture. We are confident that a more accurate face geometry can be recovered from the complete video sequences.

Third, the current face mesh is very sparse. We are investigating techniques to increase the mesh resolution by using higher resolution face metrics or prototypes. Another possibility is to computer a displacement map for each triangle using color information.

Several researchers in computer vision are working at automatically locating facial features in images [29]. With the advancement of those techniques, a completely automatic face modeling system can be expected, even though it is not a burden to click just five points with our current system.

Additional challenges include automatic generation of eyeballs and eye texture maps, as well as accurate incorporation of hair, teeth, and tongues.

Conclusions

We have developed a system to construct textured 3D face models from video sequences with minimal user intervention. With a few simple clicks by the user, our system quickly generates a person's face model which is animated right away. Our experiments show that our system is able to generate face models for people of different races, of different ages, and with different skin colors. Such a system can be potentially used by an ordinary user at home to make their own face models. These face models can be used, for example, as avatars in computer games, online chatting, virtual conferencing, etc.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

REFERENCES

[1] T. Akimoto, Y. Suenaga, and R. S. Wallace. Automatic 3d facial models. *IEEE Computer Graphics and Applications*, 13(5):16–22, September 1993.

[2] J. Barron, D. Fleet, and S. Beauchemin. Performance of optical flow techniques. *The International Journal of Computer Vision*, 12(1):43–77, 1994.

[3] V. Blanz and T. Vetter. A morphable model for the synthesis of 3d faces. In *Computer Graphics, Annual Conference Series*, pages 187–194. Siggraph, August 1999

[4] B. Dariush, S. B. Kang, and K. Waters. Spatiotemporal analysis of face profiles: Detection, segmentation, and registration. In *Proc. of the 3rd International Conference on Automatic Face and Gesture Recognition*, pages 248–253. IEEE, April 1998.

[5] D. DeCarlo, D. Metaxas, and M. Stone. An anthropometric face model using variational techniques. In *Com-* puter *Graphics, Annual Conference Series*, pages 67–74. Siggraph, July 1998.
[6] S. DiPaola. Extending the range of facial types. *Journal of Visualization and Computer Animation*, 2(4):129–131, 1991.
[7] O. Faugeras. *Three-Dimensional Computer Vision: a Geometric Viewpoint*. MIT Press, 1993.
[8] P. Fua and C. Miccio. From regular images to animated heads: A least squares approach. In *Eurographics of Computer Vision*, pages 188–202, 1996.
[9] B. Guenter, C. Grimm, D. Wood, H. Malvar, and F. Pighin. Making faces. In *Computer Graphics, Annual Conference Series*, pages 55–66. Siggraph, July 1998.
[10] C. Harris and M. Stephens. A combined corner and edge detector. *In Proc. $4^{th}$ Alvey Vision Conf.*, pages 189–192, 1988.
[11] B. K. Horn. Closed-form Solution of Absolute Orientation using Unit Quaternions. *Journal of Optical Society A*, 4(4):629–642, April 1987.
[12] B. K. P. Horn and B. G. Schunk. Determining Optical Flow. *Artificial Intelligence*, 17:185–203, 1981.
[13] H. H. S. Ip and L. Yin. Constructing a 3d individualized head model from two orthogonal views. *The Visual Computer*, (12):254–266, 1996.
[14] S. B. Kang and M. Jones. Appearance-based structure from motion using linear classes of 3-d models. *Manuscript*, 1999.
[15] M. Kass, A. Witkin, and D. Terzopoulos. SNAKES: Active contour models. *The International Journal of Computer Vision*, 1:321–332, January 1988.
[16] A. Lanitis, C. J. Taylor, and T. F. Cootes. Automatic interpretation and coding of face images using flexible models. *IEEE Transactions on Pattern Analysis and Machine Intelligence*, 19(7):743–756, 1997.
[17] Y. C. Lee, D. Terzopoulos, and K. Waters. Constructing physics-based facial models of individuals. In *Proceedings of Graphics Interface*, Pages 1–8, 1993.
[18] Y. C. Lee, D. Terzopoulos, and K. Waters. Realistic modeling for facial animation. In *Computer Graphics, Annual Conference Series*, pages 55–62. SIGGRAPH, 1995.
[19] J. P. Lewis. Algorithms for solid noise synthesis. In *Computer Graphics, Annual Conference Series*, pages 263–270. Siggraph, 1989.
[20] N. Magneneat-Thalmann, H. Minh, M. Angelis, and D. Thalmann. Design, transformation and animation of human faces. *Visual Computer*, (5):32–39, 1989.
[21] F. I. Parke. Computer generated animation of faces. In *ACM National Conference*, November 1972
[22] F. I. Parke. *A Parametric Model of human Faces*. PhD thesis, University of Utah, 1974
[23] F. I. Parke and K. Waters. *Computer Facial Animation*. AKPeters, Wellesley, Mass., 1996.
[24] K. Perlin. Real time responsive animation with personality. *IEEE Transactions on Visualization and Computer Graphics*, 1(1), 1995.
[25] K. Perlin and A. Goldberg. Improv: A system for scripting interactive actors in virtual worlds. In *Computer Graphics, Annual Conference Series*, pages 205–216. Siggraph, August 1995.
[26] F. Pighin, J. Hecker, D. Lischinski, R. Szeliski, and D. H. Salesin. Synthesizing realistic facial expressions from photographs. In *Computer Graphics, Annual Conference Series*, pages 75–84. Siggraph, July 1998.
[27] S. Platt and N. Badler. Animating facial expression. *Computer Graphics*, 15(3):245–252, 1981.
[28] P. Rousseeuw and A. Leroy. *Robust Regression and Outlier Detection*. John Wiley & Sons, New York, 1987.
[29] T. Shakunaga, K. Ogawa, and S. Oki. Integration of eigentemplate and structure matching for automatic facial feature detection. *In Proc. of the $3^{rd}$ International Conference on Automatic Face and Gesture Recognition*, pages 94–99, April 1998.
[30] D. Terzopoulos and K. Waters. Physically based facial modeling, analysis, and animation. In *Visualization and Computer Animation*, pages 73–80, 1990.
[31] J. T. Todd, S. M. Leonard, R. E. Shaw, and J. B. Pittenger. The perception of human growth. *Scientific American*, (1242):106–114, 1980.
[32] T. Vetter and T. Poggio. Linear object classes and image synthesis from a single example image. *IEEE Transactions on Pattern Analysis and Machine Intelligence*, 19(7): 733–742, 1997.
[33] K. Waters. A muscle model for animating three-dimensional facial expression. *Computer Graphics*, 22(4): 17–24, 1987.
[34] Z. Zhang. Motion and structure from two perspective views: From essential parameters to euclidean motion via fundamental matrix. *Journal of the Optical Society of America A*, 14(11):2938–2950, 1997.
[35] Z. Zhang. Determining the epipolar geometry and its uncertainty: A review. *The International Journal of Computer Vision*, 27(2):161–195, 1998.
[36] Z. Zhang. Flexible camera calibration by viewing a plane from unknown orientations. In *International Conference on Computer Vision (ICCV'99)*, pages 666–673, 1999.
[37] J. Y. Zheng. Acquiring 3-d models from sequences of contours. *IEEE Transactions of Pattern Analysis and Machine Intelligence*, 16(2):163–178, February 1994.
[38] P. Fua. Using model-driven bundle-adjustment to model heads from raw video sequences. In International Conference on Computer Vision, pages 46–53, September 1999.
[39] T. S. Jebara and A. Pentland. Parameterized structure from motion for 3d adaptive feedback tracking of faces. In Proc. CVPR, pages 144–150, 1997.
[40] J. More. The levenberg-marquardt algorithm, implementation and theory. In G. A. Watson, editor, Numerical Analysis, Lecture Notes in Mathematics 630. Springer-Verlag, 1977.

What is claimed is:

1. A method for creating a 3D model of a face, comprising:

capturing at least two 2D images of the face;

identifying locations of a plurality of distinct facial features in the two images;

identifying head regions of the images, based on the identified positions of the plurality of distinct facial features;

matching points of the head regions between the images;

estimating rotation and translation of the head regions based on the matched points in the images;

determining 3D positions of the matched points based on the estimated rotation and translation to create a 3D representation of the face; and fitting a neutral face model to the 3D representation by applying deformation vectors to the neutral face model.

2. A method as recited in claim 1, wherein the identifying comprises accepting input from a human user.

3. A method as recited in claim 1, wherein the identified locations correspond to eyes, nose and mouth.

4. A method as recited in claim 1, wherein the identified locations comprise eye corners, mouth ends, and nose tip.

5. A method as recited in claim 1, further comprising:

capturing a succession of 2D images containing the head in a range of poses;

determining poses of the head by performing the following actions for each 2D image in succession:

matching points of the object in the 2D image with corresponding points of a previous 2D image whose pose is already known, wherein the matched points of the images have corresponding 3D positions in fitted neutral face model, the 3D positions being determined by the poses of the images;

calculating a pose for the 2D image that minimizes differences between projections of 3D positions of matched points of the previous image onto the given image and the corresponding matched points of the given image.

6. A method as recited in claim 1, further comprising:

capturing a succession of 2D images containing the head in a range of poses;

determining poses of the face in each of the 2D images by performing the following actions for each 2D image in succession:

matching points of the object in the 2D image with corresponding points of a previous 2D image whose pose is already known, wherein the matched points of the images have corresponding 3D positions in fitted neutral face model, the 3D positions being determined by the poses of the images;

calculating a pose for the face of the 2D image that minimizes differences between the projections of 3D positions of matched points of the previous image onto the given image and the corresponding matched points of the given image creating a texture map from the succession of 2D images in conjunction with the calculated poses of the 2D images.

7. One or more computer-readable media containing a program that is executable by a computer to create a 3D model of a face, the program comprising the following actions:

capturing at least two 2D images of the face;

identifying locations of a plurality of distinct facial features in the two images;

identifying head regions of the images, based on the identified positions of the plurality of distinct facial features;

matching points of the head regions between the images;

estimating rotation and translation of the head regions based on the matched points in the images;

determining 3D positions of the matched points based on the estimated rotation and translation to create a 3D representation of the face;

fitting a neutral face model to the 3D representation by applying deformation vectors to the neutral face model;

capturing a succession of 2D images containing the face in a range of poses;

determining poses of the face in each of the 2D images by performing the following actions for each 2D image in succession:

matching points of the object in the 2D image with corresponding points of a previous 2D image whose pose is already known, wherein the matched points of the images have corresponding 3D positions in fitted neutral face model, the 3D positions being determined by the poses of the images;

calculating a pose for the face of the 2D image that minimizes differences between the projections of 3D positions of matched points of the previous image onto the given image and the corresponding matched points of the given image; and creating a texture map from the succession of 2D images in conjunction with the calculated poses of the 2D images.

8. One or more computer-readable media as recited in claim 7, wherein the identifying comprises accepting input from a human user.

9. One or more computer-readable media as recited in claim 7, wherein the identified locations correspond to eyes, nose and mouth.

10. One or more computer-readable media as recited in claim 7, wherein the identified locations comprise eye corners, mouth ends, and nose tip.

* * * * *

Disclaimer 6,807,290 B2—Zicheng Liu, Bellevue, Wa. RAPID COMPUTER MODELLING OF FACES FOR ANIMATION. Patent dated Oct. 19, 2004. Disclaimer filed October 18, 2004, by the assignee Microsoft Corporation.

Hereby disclaims the entire term of said patent.

*(Official Gazette March 15, 2005)*

UNITED STATES PATENT AND TRADEMARK OFFICE
CERTIFICATE OF CORRECTION

PATENT NO. : 6,807,290 B2  Page 1 of 1
DATED : October 19, 2004
INVENTOR(S) : Zicheng Liu et al.

It is certified that error appears in the above-identified patent and that said Letters Patent is hereby corrected as shown below:

Delete the Disclaimer on the last page which was incorrectly added to the patent document on March 15, 2005.

Signed and Sealed this

Eighteenth Day of April, 2006

JON W. DUDAS
*Director of the United States Patent and Trademark Office*